US008869736B2

(12) United States Patent
Scudieri et al.

(10) Patent No.: US 8,869,736 B2
(45) Date of Patent: Oct. 28, 2014

(54) APPARATUS FOR APPLYING EDIBLE PEARLESCENT COATING TO A FOOD PRODUCT

(75) Inventors: Lucille M. Scudieri, Township of Washington, NJ (US); Kirk Hisashi Fujioka, Hackettstown, NJ (US); Rodger Dale Ellis, Cleveland, TN (US); Michael S. Wozniak, Hackettstown, NJ (US); Alfred V. Camporini, Hackettstown, NJ (US)

(73) Assignee: Mars, Incorporated, McLean, VA (US)

( * ) Notice: Subject to any disclaimer, the term of this patent is extended or adjusted under 35 U.S.C. 154(b) by 1230 days.

(21) Appl. No.: 12/196,782

(22) Filed: Aug. 22, 2008

(65) Prior Publication Data

US 2009/0074924 A1    Mar. 19, 2009

Related U.S. Application Data

(60) Provisional application No. 60/957,875, filed on Aug. 24, 2007.

(51) Int. Cl.
| | |
|---|---|
| A23G 3/20 | (2006.01) |
| B05B 7/14 | (2006.01) |
| A23K 1/00 | (2006.01) |
| A23G 3/34 | (2006.01) |
| A23L 1/275 | (2006.01) |
| A23L 1/00 | (2006.01) |
| A23K 1/18 | (2006.01) |
| B05B 15/12 | (2006.01) |

(52) U.S. Cl.
CPC ............ *A23G 3/2084* (2013.01); *B05B 7/1445* (2013.01); *A23K 1/004* (2013.01); *A23G 3/0097* (2013.01); *A23L 1/275* (2013.01); *A23L 1/005* (2013.01); *A23K 1/1846* (2013.01); *A23G 3/0085* (2013.01); *B05B 15/1207* (2013.01); *B05B 15/1229* (2013.01)
USPC .................. 118/13; 118/19; 118/20; 118/24; 118/308; 118/324; 99/467; 99/494

(58) Field of Classification Search
USPC ............ 118/13, 19, 20, 24, 308, 324, DIG. 5; 99/494, 467; 426/289, 294, 295; 106/217.01, 501.1
See application file for complete search history.

(56) References Cited

U.S. PATENT DOCUMENTS

| | | | |
|---|---|---|---|
| 3,667,676 A | 6/1972 | Watanabe et al. | |
| 5,279,046 A * | 1/1994 | Vincent ......................... | 34/500 |

(Continued)

FOREIGN PATENT DOCUMENTS

| | | |
|---|---|---|
| DE | 19517229 A1 | 11/1996 |
| JP | 2004208596 A | 7/2004 |

(Continued)

OTHER PUBLICATIONS

PCT Notification of Transmittal of the International Search Report and the Written Opinion of the International Searching Authority, of the Declaration (Form PCT/ISA/220); PCT International Search Report (Form PCT/ISA/210); PCT Written Opinion of the International Searching Authority (Form PCT/ISA/237).

*Primary Examiner* — Laura Edwards
(74) *Attorney, Agent, or Firm* — Mars, Incorporated; Colleen Kramer

(57) ABSTRACT

The present invention is directed to a powder spray apparatus for preparing a food product having an edible pearlescent coating, comprising: a spray zone having a spray device positioned proximate to at least one food product located in the spray zone for application of an edible pearlescent powder to the food product; a chamber for holding the edible pearlescent powder that is in fluid communication with the spray device; and a vibrator and/or a continuous forced air supply that assists in fluidizing the edible pearlescent powder in the chamber for delivery to the spray device. A method of using this apparatus and an edible pearlescent powder composition adapted for use in this apparatus are also disclosed.

14 Claims, 4 Drawing Sheets

(56) References Cited

U.S. PATENT DOCUMENTS

| | | | |
|---|---|---|---|
| 5,401,534 A | * | 3/1995 | Bourreau et al. ............. 427/212 |
| 5,767,107 A | * | 6/1998 | Chaundy et al. ................ 514/54 |
| 5,858,078 A | | 1/1999 | Andes et al. |
| 2004/0033293 A1 | | 2/2004 | Albert |
| 2004/0166211 A1 | | 8/2004 | Gesford et al. |
| 2004/0166214 A1 | | 8/2004 | Gesford et al. |
| 2004/0182283 A1 | | 9/2004 | Steffenino et al. |
| 2005/0147724 A1 | * | 7/2005 | Schweinfurth ............... 426/540 |
| 2007/0059433 A1 | | 3/2007 | Albert |
| 2008/0014321 A1 | | 1/2008 | Schweinfurth et al. |
| 2008/0145493 A1 | * | 6/2008 | Myers et al. .................. 426/250 |

FOREIGN PATENT DOCUMENTS

| | | |
|---|---|---|
| WO | 2008/042802 A2 | 4/2008 |
| WO | 2008/076902 A1 | 6/2008 |

\* cited by examiner

APPARATUS FOR APPLYING EDIBLE PEARLESCENT COATING TO A FOOD PRODUCT

This application claims the benefit of U.S. Provisional Application No. 60/957,875, filed Aug. 24, 2007, which is incorporated herein by reference.

BACKGROUND OF THE INVENTION

1. Field of the Invention

The present invention relates to an apparatus and a method of applying an edible pearlescent coating to a food product. More particularly, the present invention relates to an apparatus and a method of continuously applying an edible pearlescent coating in a dry powdered form to a food product. Another aspect of the present inventions includes an edible pearlescent powder composition adapted for use in a spray apparatus.

2. Description of Related Art

Edible pearlescent powder has recently been approved by the Food and Drug Administration for food applications. Presently, pearlescent powders are applied by hand on a small-scale basis to confectionery products, particularly to chocolate products. However, such a technique is not conducive for large-scale manufacturing. In addition, a significant disadvantage of this technique is that it does not result in a thin, uniform coating of edible pearlescent powder on a food product. Presently, the only technique to apply a pearlescent coating through a spray device is using an alcohol suspension of the pearlescent powder. However, it is a significant disadvantage to apply an alcohol suspension to a food product, particularly a chocolate product. A method and apparatus for continuously applying a dry pearlescent powder, i.e., that has not been suspended in a liquid has not previously existed.

Currently, a need exists for an apparatus and a process for the continuous application of an edible pearlescent coating to a food product on a large-scale basis. The goal of the application operation is to coat the food products evenly, homogeneously and to the same extent, day after day.

SUMMARY OF THE INVENTION

The present invention is directed to a powder spray apparatus for preparing a food product having an edible pearlescent coating. The apparatus comprises: a spray zone having a spray device positioned proximate to at least one food product located in the spray zone for application of an edible pearlescent powder to the food product; a chamber for holding the edible pearlescent powder that is in fluid communication with the spray device; and a vibrator and/or a means for providing continuous forced air that assists in fluidizing the edible pearlescent powder in the chamber for delivery to the spray device.

The present invention is also directed to a method of applying an edible pearlescent coating to a food product. The method comprises the steps of: fluidizing the edible pearlescent powder in a chamber that is in fluid communication with a spray device; and applying the fluidized edible pearlescent powder to the food product with the spray device.

The present invention is also directed to an edible pearlescent powder for spray application to an edible product. The powder comprises an edible pearlescent composition and a fluidizing agent in an amount effective to assist in fluidizing the powder in a powder spray application. Other edible powders having properties similar to that of edible pearlescent powder may also be used in the present invention. This may include other edible powders that are difficult to fluidize.

DETAILED DESCRIPTION OF THE INVENTION

Figure 1:
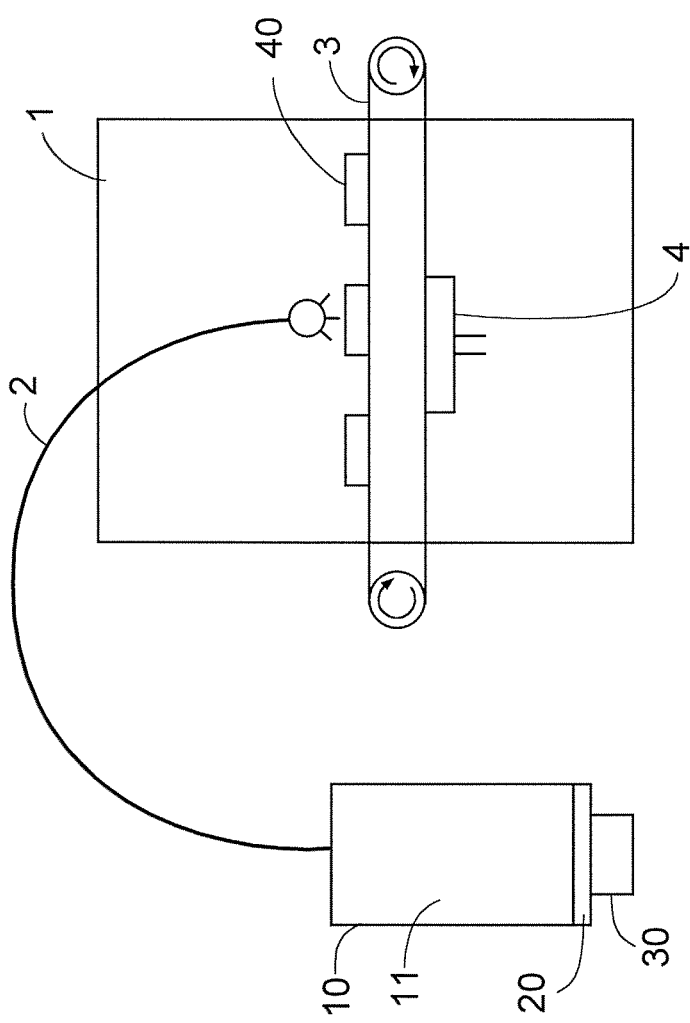
FIG. 1 is a schematic representation of an embodiment of the powder spray apparatus of the invention.

One embodiment of the present invention is directed to a powder spray apparatus for preparing a food product having an edible pearlescent coating. The apparatus comprises:

a spray zone having a spray device positioned proximate to at least one food product located in the spray zone for application of an edible pearlescent powder to the food product;

a chamber for holding the edible pearlescent powder that is in fluid communication with the spray device; and a vibrator and/or a means for providing continuous forced air that assists in fluidizing the edible pearlescent powder in the chamber for delivery to the spray device.

The spray device may be a spraying gun or other device capable of delivering a curtain or cloud of pearlescent powder in the spraying zone. Such spray guns are known and readily available, having been used for painting appliances, furniture or automobile parts with powder coatings.

In one embodiment, the edible pearlescent powder may be fluidized by using a vibrator to vibrate the edible pearlescent powder held in the chamber. Vibrating devices, e.g., pneumatic or electrical vibrating devices, are readily available, such as those made by VIBCO Vibrators, Inc., Wyoming, R.I., and POWTEK Corp., Bensalem, Pa. The vibrator will be located against the chamber or in a position proximate to the chamber that allows for the transfer of vibrating energy to the chamber. Of course, if desired, more than one vibrator may be used.

In yet another embodiment, the edible pearlescent powder may be fluidized by introducing continuous forced air into the chamber containing the powder. The forced air may be introduced at the bottom of the chamber, forcing the edible pearlescent powder up into the spray device. The forced air may be provided by a blower or fan. In the most preferred embodiment, the apparatus will include a vibrator. If a larger cloud density is desired it will also be preferable to have a means for providing continuous forced air.

The apparatus may further comprise a supply conduit and control valve for metered addition of pearlescent powder to the chamber during operation of the apparatus. It is preferable to maintain the pearlescent powder in the chamber at a substantially constant level to ensure a consistent and uniform pearlescent coating. The consistency of the pearlescent coating can be varied using the control valve described above.

The spray zone may further comprise a spray zone conveyor capable of transporting the at least one food product through the spray zone. Preferably, the spray zone conveyor may be a wire belt or other type of perforated conveyor to allow the pearlescent powder to surround the food.

The spray zone may further comprise a vacuum device for controlling cloud density of the edible pearlescent powder. Such a device may be placed under the spray zone conveyor, and is useful for maintaining an even distribution of spray as well as for ensuring that the pearlescent powder that has been sprayed does not leave the spray zone. The excess pearlescent powder may be collected via the vacuum device and recycled.

In another embodiment, the apparatus may further comprise an application zone upstream of the spray zone. The application zone may have an applicator positioned proximate to an application zone conveyor that is capable of transporting food product through the application zone for application of an edible adhesive coating. The applicator may be a spray device for spraying an edible adhesive coating. The application zone conveyor may be a wire belt. In a preferred embodiment, the application zone may be an enrober.

In another embodiment, the apparatus may further comprise a conditioning zone located between the application zone and the spray zone. The conditioning zone may include a conditioning conveyor and a chilling device for chilling the bottom of the edible adhesive coated food product and means for maintaining the air in the conditioning zone at a dew point below a temperature of the chilling device. Chilling the bottom of the edible adhesive coated food product solidifies the bottom of the product and enables the transfer of the food product from the application zone to the spray zone via the conditioning conveyor without damaging the bottom of the product.

The chilling device may be a chilled platen or any other device capable of cooling the bottom of the food product. The conditioning conveyor may be a conditioning belt, such as, a food process or food grade type belt, for example, made of urethane, fiberglass, or Teflon®.

In another embodiment of the present invention, the apparatus may further comprise a coating pan having the spray zone located therein and capable of tumbling a plurality of confectionery pieces. Coating pans for panning confectioneries are well known. However, application of a pearlescent powder to confectionery pieces in a coating pan by spraying of the pearlescent powder was not previously possible.

Another embodiment of the present invention is directed to a method of applying an edible pearlescent coating to a food product comprising the steps of:

fluidizing the edible pearlescent powder in a chamber that is in fluid communication with a spray device; and applying the fluidized edible pearlescent powder to the food product with the spray device.

The step of fluidizing may be accomplished by vibrating the chamber and/or introducing a continuous forced air into the chamber. When the fluidizing step comprises vibrating the chamber containing the edible pearlescent powder using a pneumatic vibrator, generally, the pressure applied to the vibrator will be about 4 to about 20 psi, preferably at a pressure of about 4 to about 6 psi and most preferably at a pressure of about 4.5 to 5 psi. The greater the vibrating energy, the denser the cloud of pearlescent powder. When the fluidizing step includes introducing continuous forced air into the chamber containing the edible pearlescent powder, the air will preferably be introduced in the lower portion or bottom of the chamber so that it rises through the powder and assists in fluidization. As used herein, continuous forced air means continuous while the powder is being sprayed, and would also include continuous bursts of air that assisted in fluidization. Generally the air velocity can be adjusted to increase the density of the cloud. Preferably, the fluidizing step consists of vibrating the chamber. If a larger cloud density is desired it is also preferable to introduce continuous forced air into the chamber. A person of ordinary skill in the art can readily see from the description above that the amount of pearlescent powder deposited on an edible food product can be controlled by varying the density of the pearlescent cloud emitted from spray device by selecting an appropriate vibratory energy and/or forced air speed.

To ensure that the edible pearlescent powder adheres to the edible food product, the surface of the food product will need to be sticky or tacky. In one embodiment, this is accomplished by the step of warming the outer surface of a confectionery to produce a soft and tacky surface prior to applying the edible pearlescent powder.

In another embodiment, this sticky or tacky surface is achieved by the step of applying an edible adhesive agent to the food product prior to applying the edible pearlescent powder.

The edible adhesive agent may be any edible coating that is sticky or tacky when warmed, but will solidify at room temperature, e.g. about 21° C. A preferred edible adhesive agent is chocolate. Other preferred edible adhesives include food grade shellacs (for example, Opaglos® available from Colorcon, Inc., West Point, Pa.), film forming agents (for example, Capol® available from Centerchem, Inc., Norwalk, Conn.), water-based glazes, corn syrup, sugar syrup, polishing gums, cocoa butter or other fats. As used herein, chocolate includes standard of identity (SOI) chocolate, such as milk chocolate, dark chocolate or white chocolate, and also includes any non-SOI chocolate, such as compound coatings, that mimics the look of SOI chocolate. The preparation of both SOI and non-SOI chocolate is well known to those skilled in the art. The chocolate may be applied to the confectionery with an enrober.

In an embodiment of the present invention, the chocolate enrobed confectionery is transported to a conditioning zone. The conditioning zone may include a conditioning conveyor and a chilling device. The temperature of the chilling device is set to solidify a surface of the chocolate enrobed confectionery contacting the conveyor while a surface of the chocolate enrobed confectionery that does not contact the conveyor remains soft and tacky.

Generally, the temperature of the chilling device is set in a range of about −5° C. to about −40° C., preferably, the temperature of the chilling device is in a range of about −10° C. to about −25° C., and more preferably, the temperature of the chilling device is in a range of about −15° C. to about −20° C.

The air in the conditioning zone is preferably maintained at a dew point below the temperature of the chilling device. As used herein, the term air includes naturally available air or inert gases, such as, nitrogen, or mixtures thereof.

Generally, the dew point of the air in the conditioning zone is at least about 1° C. below the temperature of the chilling device, preferably, the dew point of the air in the conditioning zone is about 3° C. below, and more preferably, the dew point of the air in the conditioning zone is about 5° C. below the temperature of the chilling device. Maintaining the dew point of the air as described above serves to avoid ice formation on the chilling device.

When the edible adhesive is SOI-chocolate, the air temperature of the conditioning zone will generally be maintained at a temperature of about 20° C. to about 35° C., preferably about 20° C. to about 27° C., more preferably about 20° C. to about 25° C., and most preferably about 20° C. to about 23° C. These temperatures have been found to maintain the upper surface of the chocolate confectionery in a semi-liquid or tacky state. Of course the air temperature of the conditioning zone may be varied depending on the resident time of the confectionery in the conditioning zone and the mass of the confectionery to maintain this desired tacky state. In addition one of ordinary skill will recognize that the air temperatures may be significantly higher for compound coatings or for other edible adhesives in which loss of temper is not a concern.

The food products coated by the apparatus and method of this invention include any food products, including confectionery items, ice creams and pet foods. Particularly preferred food products include chocolate enrobed confectionery bars.

It is important that the food product have a surface that is sticky at the time of application of the edible pearlescent powder so that the powder adheres to the product. This can be achieved by applying an edible adhesive agent to the food product prior to applying the edible pearlescent powder. As noted previously, a preferred edible adhesive agent may be chocolate. Alternatively, the outer surface of the food product, such as a chocolate-coated confectionery, may be warmed to produce a soft and tacky surface prior to applying the edible pearlescent powder.

In yet another embodiment of the present invention, the food product is a plurality of confectionery pieces and the method further comprises the step of tumbling the plurality of confectionery pieces in a coating pan while applying the edible adhesive coating and the edible pearlescent powder. Preferably, the edible adhesive agent is chocolate or a sugar syrup or a food grade coating material or shellac in this embodiment.

The edible pearlescent coating is applied in a dry powdered form. The powder consists of flat, platelet-like particles, which are not easily dispersed. To assist in fluidizing the edible pearlescent powder, a fluidizing agent may be added to the pearlescent powder. Other edible powders having properties similar to that of edible pearlescent powder may also be used in the present invention. This may include other edible powders that are difficult to fluidize.

One embodiment of this invention is directed to an edible pearlescent powder for spray application to an edible product comprising an edible pearlescent composition and a fluidizing agent in an amount effective to assist in fluidizing the powder in a powder spray application.

Generally, the fluidizing agent is present in the edible pearlescent powder in an amount of about 1 to about 70 percent by weight of the powder, preferably, in an amount of about 10 to about 50 percent by weight of the powder, and more preferably, in an amount of about 15 to about 35 percent by weight of the powder.

The size of the fluidizing agent has been found to be an important factor in determining the appearance of the food product coated with edible pearlescent powder. If the size of the fluidizing agent is too large, the surface of the coated food product is generally rough. On the other hand, if the size of the fluidizing agent is too small, the pearlescent powder will not be fluidized. Generally, the fluidizing agent has an average particle size in a range of about 5 to about 25 microns, preferably, about 10 to about 20 microns, and more preferably, about 15 to about 17 microns.

Preferably, the fluidizing agent is selected from the group consisting of corn starch, potato starch, mixtures thereof, and the like.

FIG. 1 illustrates an embodiment of a powder spray apparatus of this invention. The spray zone 1 has a moving spray zone conveyor, such as, a wire belt 3. Food products, such as, confectionery items 40 having a sticky surface, are placed on the spray zone conveyor 3. A chamber 10 holds edible pearlescent powder 11. The edible pearlescent powder preferably is a mixture of edible pearlescent composition and a fluidizing agent, such as, corn starch. A vibrator 20 is attached to the bottom of the chamber 10. A continuous forced air supply, such as, a blower or a fan 30 is also attached at the bottom of the chamber 10 and is located below the vibrator 20. A spray device, such as, a spray gun 2 is connected to the chamber 10. The vibrator 20 and the forced air supply 30 fluidize the edible pearlescent powder 11 and force the powder from the chamber 10 up into the spray device 2. The spray device 2 applies the edible pearlescent powder 11 on the food products 40, producing an edible pearlescent coating on the food products 40. The excess edible pearlescent powder 11 is removed from the spray zone conveyor 3 via a vacuum device 4 placed underneath the spray zone conveyor 3.

Figure 2:
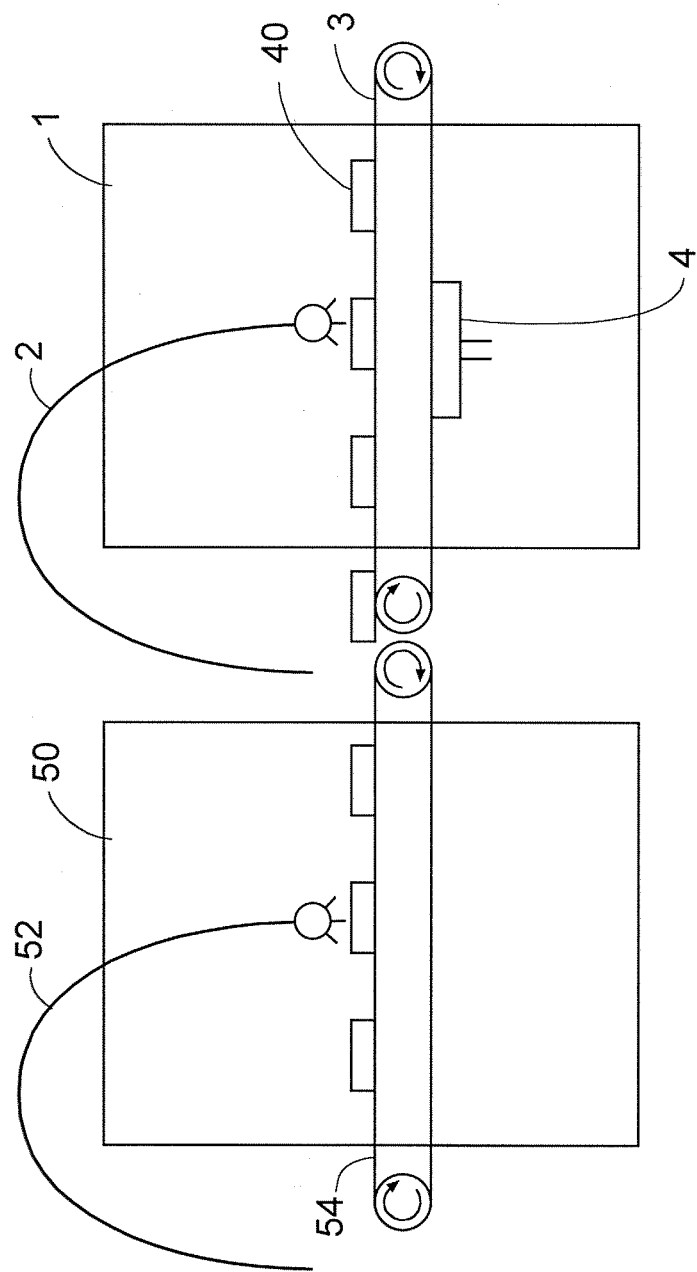
FIG. 2 is a schematic representation of another embodiment of the powder spray apparatus of the invention which includes a spray zone and an application zone.

FIG. 2 illustrates another embodiment of the powder spray apparatus of the invention which includes a spray zone and an application zone. The application zone 50 has a moving application zone conveyor, such as, a wire belt 54. Food products, such as, confectionery items 40 are placed on the application zone conveyor 54. An applicator, such as, a spray device 52 applies an edible adhesive coating on the food products 40. The food products 40 coated with an edible adhesive coating are then transferred from the application zone conveyor 54 to the spray zone conveyor 3. The spray zone conveyor 3 transports the food products 40 through the spray zone 1, where they are sprayed with an edible pearlescent coating, as described in FIG. 1.

Figure 3:
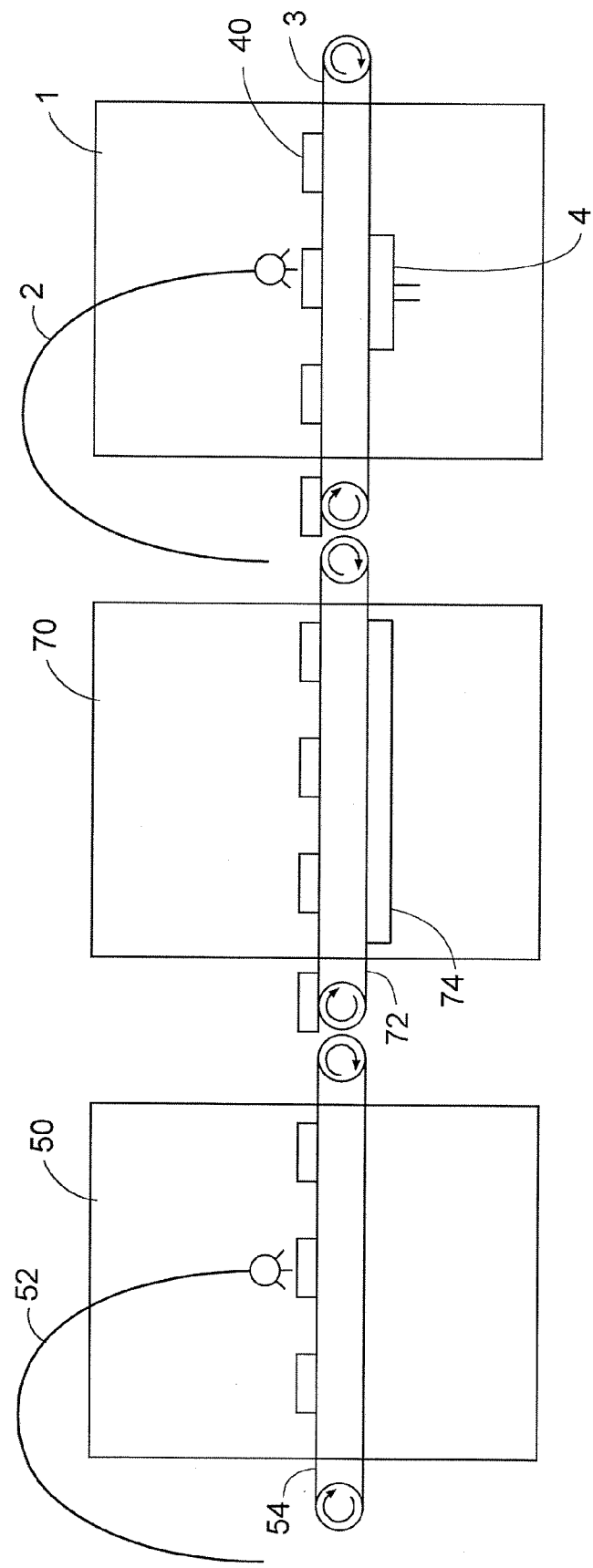
FIG. 3 is a schematic representation of yet another embodiment of the powder spray apparatus of the invention which includes a spray zone, a conditioning zone and an application zone.

FIG. 3 illustrates yet another embodiment of the powder spray apparatus of the invention which includes a spray zone, a conditioning zone and an application zone. The food products 40 are placed on the application zone conveyor 54 and are coated with an edible adhesive coating in the application zone 50, as described in FIG. 2. The food products 40 coated with an edible adhesive coating are then transferred from the application zone conveyor 54 to the conditioning zone conveyor, such as, a conditioning belt 72. The conditioning zone conveyor 72 transports the food products 40 through the conditioning zone 70. The conditioning zone 70 consists of a chilling device, such as, a chilled platen 74 which chills the bottom of the edible adhesive coated food products 40. The food products 40 are then transferred from the conditioning zone conveyor 72 to the spray zone conveyor 3. The spray zone conveyor 3 transports the food products 40 through the spray zone 1, where they are sprayed with an edible pearlescent coating, as described in FIG. 1

Figure 4:
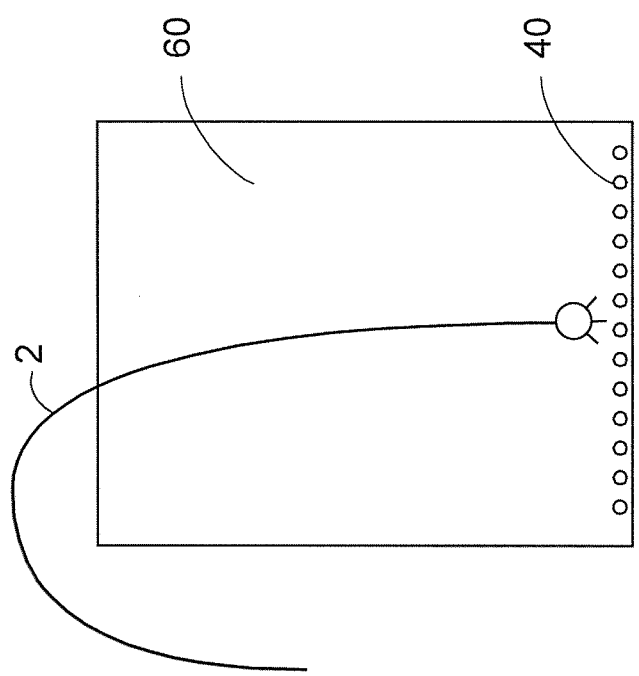
FIG. 4 illustrates the powder spray apparatus of the invention having its spray zone located in a coating pan.

FIG. 4 illustrates the powder spray apparatus of the invention having its spray zone located in a coating pan. The coating pan 60 has a spray device, such as, a spray gun 2. The food products 40, preferably confectionery pieces, are placed in the coating pan 60 and the spray device 2 applies the edible pearlescent powder on the tumbling food products 40 as described in FIG. 1, producing an edible pearlescent coating on the food products 40. Optionally, the food products 40 can be coated with an edible adhesive coating and the edible pearlescent powder.

Another embodiment of this invention is directed to a conditioning apparatus or tunnel, which includes a conditioning conveyor and chilling device in a conditioning zone as described above. The chilling device is located beneath the conveyor so that the surface of the confectionery, preferably a chocolate confectionery, and most preferably a chocolate-enrobed confectionery, that contacts the conveyor, i.e., the bottom surface, may be solidified. The apparatus includes an air input into the conditioning zone so that the air within the conditioning zone may be maintained at a temperature that causes the surface of the confectionery that is not in contact with the conveyor, i.e., the upper surface, to remain in a semi-liquid or tacky state while the bottom is solidified. As previously noted the dew point of the air in the conditioning zone is maintained below the temperature of the chilling device to avoid formation of ice on the chilling device. Solidifying the bottom of the confectionery in the conditioning apparatus allows for transfer of the confectionery to another conveyor for further processing without damaging the bottom surface of the confectionery.

Yet another embodiment of this invention is a decorative apparatus which includes the combination of the above-described conditioning apparatus and application apparatus having an application conveyor and an applicator for applying decorative edible material to the tacky or semi-liquid surface of the confectionery. Using this decorative apparatus, the confectionery is transferred from the conditioning conveyor to the application conveyor for application of the decorative edible material. The upper surface of the confectionery is then cooled so as to solidify the confectionery surface and adhere the decorative edible material to the upper surface of the confectionery. The apparatus is most preferably used with chocolate enrobed confectionery.

The decorative edible material that may be applied with the application apparatus include, for example, food grade powders such as pearlescent powders, confectioners sugar, cinnamon, cocoa powder, nuts, dried fruit pieces and drizzled/deposited chocolate or decorative sugar. Using this apparatus and process allows the decorative material to blend or become embedded within the semi-liquid or tacky surface of the confectionery to provide it with a unique appearance and adhere the material to the confectionery. If drizzled/deposited chocolate is employed, the apparatus and method provides a means for obtaining an integral combination of the applied decorative chocolate and the chocolate confection resulting in a highly refined decorative confectionery product. This apparatus and method also helps avoid chocolate tailing or "feet" defects to appear on the bottom side portion of the confectionery. In addition, any unused decorative material may be reclaimed and recycled using these methods and apparatus of this invention.

It should be clear to a person of ordinary skill in the art, that this invention also includes the method of conditioning a confectionery using the conditioning apparatus described above and the method of decorating a confectionery using the decorative apparatus described above. The temperature of the chilling device, the temperature of the conditioning air and the dew point of the conditioning air that would preferably be used for a chocolate enrobed confectionery conditioned using the above described apparatus and method have been previously described in association with the application of pearlescent powder.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. An apparatus comprising:
   An edible adhesive applicator for applying an edible adhesive to a food product;
   A conditioning zone configured to maintain an upper portion of the adhesive coated food product in a semi-fluid or tacky state while the bottom portion is solidified;
   A spray device comprising a chamber for housing an amount of a dry edible pearlescent powder and in fluid communication with the spray device, the chamber being in communication with a vibrator and a source of continuous forced air so that fluidized dry edible pearlescent powder is delivered from the chamber to the spray device; and
   A conveyor adapted to transport at least one food product between the edible adhesive applicator, conditioning zone and spray device.

2. The apparatus of claim 1, wherein the forced air communicates with a bottom of the chamber of the spray device to assist in fluidizing the dry edible pearlescent powder in the chamber.

3. The apparatus of claim 2, wherein said forced air is provided by a blower or fan.

4. The apparatus of claim 1, further comprising a supply conduit and control valve for metered addition of the dry edible pearlescent powder to the chamber during operation of the spray device.

5. The apparatus of claim 1, further comprising a coating pan capable of tumbling a plurality of food products and positioned proximate to the spray device.

6. The apparatus of claim 1, wherein the conditioning zone comprises a chilling device.

7. The apparatus of claim 6, wherein the chilling device is a chilled platen.

8. The apparatus of claim 1, wherein the conditioning zone comprises means for maintaining the air in the conditioning zone at a dew point below a temperature of the chilling device.

9. The apparatus of claim 1, wherein the edible adhesive applicator comprises an enrober.

10. The apparatus of claim 1, wherein the edible adhesive applicator comprises a spray device.

11. The apparatus of claim 1, wherein the conveyor comprises a belt.

12. The apparatus of claim 11, wherein the conveyor comprises a wire belt.

13. The apparatus of claim 1, further comprising a vacuum for controlling cloud density of the dry edible pearlescent powder.

14. The apparatus of claim 13, wherein the vacuum further collects and recycles an excess of the dry edible pearlescent powder.

* * * * *